United States Patent
Szymanski (10) Patent No.: US 11,142,034 B2
(45) Date of Patent: Oct. 12, 2021

(54) ROTATING LATCH ASSEMBLY FOR RAISING AND LOWERING THE HEIGHT OF A VEHICLE

(71) Applicant: BeijingWest Industries Co., Ltd., Beijing (CN)

(72) Inventor: Jerzy Piotr Szymanski, Villeneuve Sablons (FR)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 172 days.

(21) Appl. No.: 16/384,019

(22) Filed: Apr. 15, 2019

(65) Prior Publication Data
US 2019/0351725 A1 Nov. 21, 2019

Related U.S. Application Data

(60) Provisional application No. 62/674,588, filed on May 21, 2018.

(51) Int. Cl.
*B60G 17/015* (2006.01)
*B60G 17/005* (2006.01)

(52) U.S. Cl.
CPC ....... *B60G 17/0157* (2013.01); *B60G 17/005* (2013.01); *B60G 2202/42* (2013.01);
(Continued)

(58) Field of Classification Search
CPC .. B60G 17/00; B60G 17/0157; B60G 17/005; B60G 2500/30; B60G 2202/42;
(Continued)

(56) References Cited

U.S. PATENT DOCUMENTS 3,618,927 A * 11/1971 Nicholls ................. F16F 9/38
267/48
3,938,793 A * 2/1976 Kaptanis ............... F16F 9/0254
267/120
(Continued)

FOREIGN PATENT DOCUMENTS

CN 2012072784 A 4/2012
CN 105612068 A 6/2016
(Continued)

OTHER PUBLICATIONS

Extended European Search Report dated Dec.17, 2019 for counterpart European patent application No. EP19173770.9.
(Continued)

*Primary Examiner* — Frank B Vanaman
(74) *Attorney, Agent, or Firm* — William H. Honaker; Dickinson Wright PLLC (57) ABSTRACT

A rotating latch assembly includes a lift housing extending between a first opened end and a second opened end and defining a chamber extending therebetween. A support tube is slidably disposed in the chamber and extends between a first end and a second end. The lift housing is movable along the support tube between an extended position and a lowered position in response to a movement provided by an actuator wherein the extended position is the lift housing being adjacent to the first end and the lowered position is the lowered position being adjacent to the second end. A retaining member is disposed between the lift housing and the support tube and attached to the support tube and the lift housing for maintaining the lift housing in the extended position as the lift housing moving from the lowered position to the extended position.

16 Claims, 6 Drawing Sheets

(52) U.S. Cl.
CPC .. *B60G 2204/44* (2013.01); *B60G 2204/4604* (2013.01); *B60G 2500/30* (2013.01)

(58) Field of Classification Search
CPC .......... B60G 2202/441; B60G 2204/42; B60G 2204/46; B60G 2204/4604
See application file for complete search history.

(56) References Cited

U.S. PATENT DOCUMENTS

| | | | |
|---|---|---|---|
| 4,458,887 A * | 7/1984 | Shimokura | F16F 9/0254 188/300 |
| 7,926,822 B2 | 4/2011 | Ohletz et al. | |
| 8,516,914 B2 | 8/2013 | Osterlanger | |
| 9,694,643 B2 | 7/2017 | Mersmann et al. | |
| 9,707,819 B2 | 7/2017 | Dobre et al. | |
| 2001/0032462 A1 * | 10/2001 | Beck | F16F 9/064 60/477 |
| 2017/0197484 A1 | 7/2017 | Mersmann et al. | |
| 2019/0248203 A1 * | 8/2019 | Krehmer | B60G 17/0157 |
| 2019/0359021 A1 * | 11/2019 | Szymanski | B60G 17/005 |
| 2020/0055361 A1 * | 2/2020 | Krehmer | B60G 17/02 |

FOREIGN PATENT DOCUMENTS

| | | |
|---|---|---|
| CN | 106799945 A | 6/2017 |
| DE | 102010017352 A1 | 12/2011 |
| DE | 102014206142 A1 | 2/2015 |
| DE | 102014215420 A1 | 2/2015 |
| DE | 102014225584 A1 | 8/2015 |
| DE | 102014203684 A1 | 9/2015 |
| DE | 102015224862 A1 | 6/2017 |
| DE | 102016212884 A1 | 1/2018 |
| DE | 102016213623 A1 | 2/2018 |
| EP | 1953013 A2 | 8/2008 |
| JP | 1975054775 A | 5/1975 |
| JP | 2016530154 A | 9/2016 |
| WO | 2015021952 A1 | 2/2015 |

OTHER PUBLICATIONS

First Office Action and search report dated Jun. 2, 2020 for counterpart Chinese patent application No. 201910339066.6, along with machine EN translation downloaded from EPO.
First Office Action issued for corresponding Japanese Patent Application 2019-095044 dated Apr. 21, 2020.

* cited by examiner

ROTATING LATCH ASSEMBLY FOR RAISING AND LOWERING THE HEIGHT OF A VEHICLE

CROSS-REFERENCE TO RELATED APPLICATIONS

This application claims the benefit of U.S. Provisional Application Patent Ser. No. 62/674,588, filed May 21, 2018, the entire disclosure of which is hereby incorporated herein by reference.

BACKGROUND OF THE INVENTION

1. Field of the Invention

The present invention generally relates to a rotating latch assembly for raising and lowering the height of a vehicle.

2. Description of the Prior Art

Devices for adjusting the height of a vehicle body are known. The devices may be provided in the suspension struts of motor vehicles, in particular, for increasing the ground clearance of motor vehicles or lowering the body for flat road surfaces. Typically, such a device includes a lift housing disposed on a center axis defining a chamber. A support tube is disposed in the chamber with the lift housing being movable along the center axis relative to the support tube. The movement of the lift housing is typically conducted using a hydraulic actuator. However, if the lift housing needs to be held in an extended position to increase the height of a vehicle, a constant hydraulic pressure is required. Accordingly, the hydraulic pump needs to work/restart periodically due to unavoidable internal leaks. Solenoid activated mechanisms, e.g. a pneumatic suspension are also available for this type of application. However, the solenoid activated mechanisms require electric power input for the locking/unlocking of the solenoid valve which cumulates with the required hydraulic power.

One such a device is disclosed in U.S. Pat. No. 9,707,819. The device includes a lift housing disposed on a center axis and extending between a first opened end and a second opened end and defining a chamber extending therebetween. A support tube is slidably disposed in the chamber and extending between a first end and a second end. The first end is disposed outside of the chamber and axially spaced from the first opened end. The second end of the support tube is disposed outside of the chamber and axially spaced from the second opened end. The lift housing is movable along the support tube between an extended position and a lowered position in response to a movement provided by an actuator. The extended position is defined as the lift housing being adjacent to the first end for raising the height of the vehicle. The lowered position is defined as the lift housing being adjacent to the second end for lowering the height of the vehicle.

SUMMARY OF THE INVENTION

The present invention provides for a rotating latch assembly that efficiently raises and lowers the height of the vehicle thereby improving vehicle energy consumption due to reduced air drag. In addition, the present invention maintains the vehicle being in the raised position without additional energy consumption. Furthermore, the present invention prevents unintentional movements of the rotating latch assembly from the extended position to the lowered position.

It is one aspect of the present invention to provide a rotating latch assembly for raising and lowering a vehicle. The rotating latch assembly includes a lift housing disposed on a center axis and extending between a first opened end and a second opened end and defining a chamber extending therebetween. A support tube is slidably disposed in the chamber and extends between a first end and a second end. The first end is disposed outside of the chamber and axially spaced from the first opened end. The second end of the support tube is disposed outside of the chamber and axially spaced from the second opened end. The lift housing is movable along the support tube between an extended position and a lowered position in response to a movement provided by an actuator. The extended position is defined as the lift housing being adjacent to the first end for raising the height of the vehicle. The lowered position is defined as the lift housing being adjacent to the second end for lowering the height of the vehicle. A retaining member is disposed between the lift housing and the support tube and attached to the support tube and the lift housing for maintaining the lift housing in the extended position as the lift housing moving from the lowered position to the extended position and allowing the lift housing to move from the extended position to the lowered position.

It is another aspect of the present invention to provide a rotating latch assembly for raising and lowering a vehicle. The rotating latch assembly includes a lift housing disposed on a center axis extending between a first opened end and a second opened end and defining a chamber extending therebetween. A support tube is slidably disposed in the chamber and extending between a first end and a second end. The first end is disposed outside of the chamber and axially spaced from the first opened end. The second end of the support tube is disposed outside of the chamber and axially spaced from the second opened end. A projection is disposed in the chamber and extends radially outwardly from the support tube to a distal end for engaging the lift housing. A protrusion is disposed in the chamber and adjacent to the second opened end extending radially inwardly from the lift housing and toward the center axis for engaging the projection to allow the lift housing to move axially along the support tube between an extended position and a lowered position in response to a movement provided by an actuator. The extended position is defined as the lift housing being adjacent to the first end for raising the height of the vehicle. The lowered position is defined as the lift housing being adjacent to the second end for lowering the height of the vehicle. A retaining member is disposed between the lift housing and the support tube and attached to the support tube and the lift housing for maintaining the lift housing in the extended position as the lift housing moving from the lowered position to the extended position and allowing the lift housing to move from the extended position to the lowered position.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
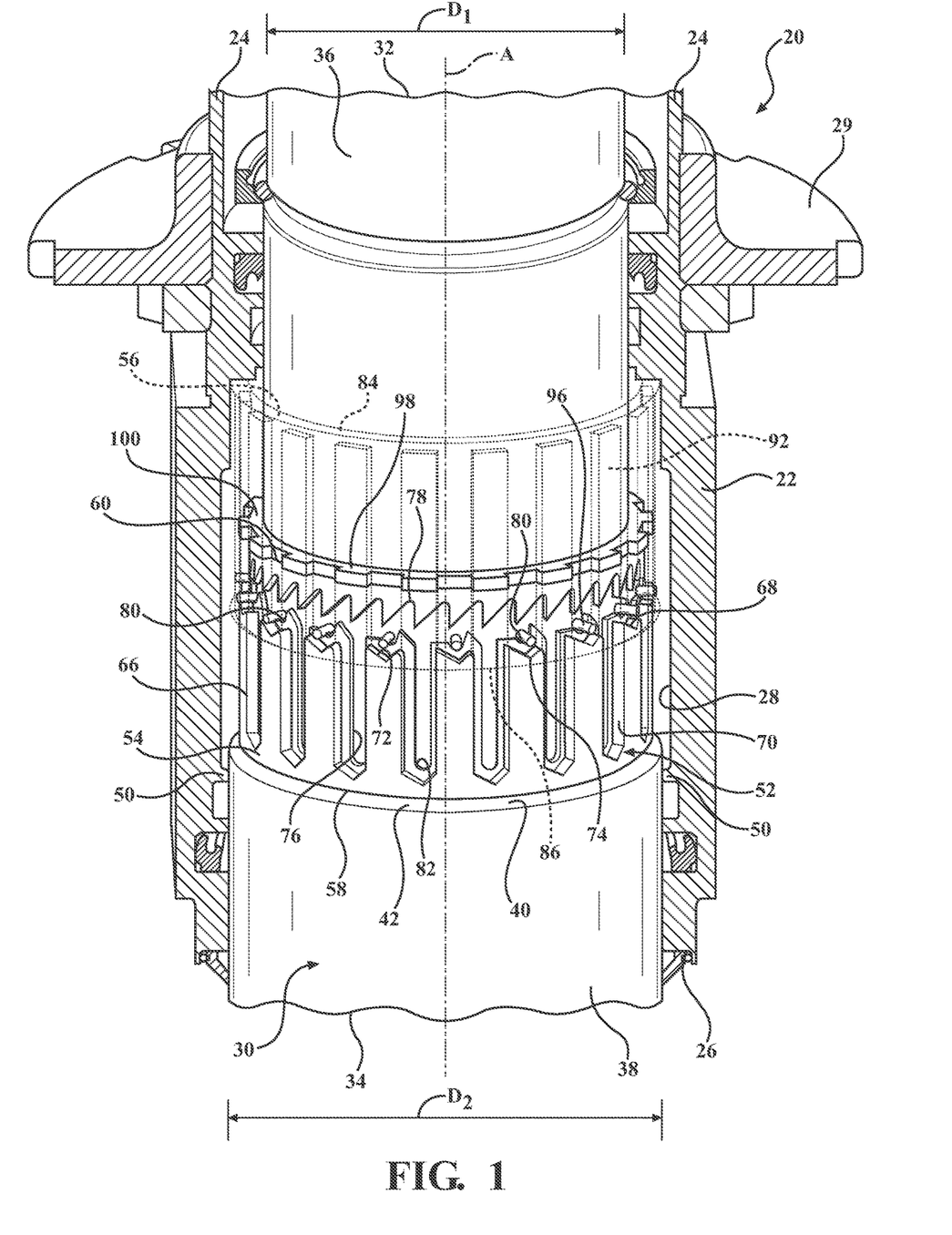
FIG. 1 is a perspective view of the rotating latch assembly.

Referring to the Figures, wherein like numerals indicate corresponding parts throughout the several views, a rotating latch assembly 20 constructed in accordance with one embodiment of the present invention is generally shown in FIG. 1. Typically, the rotating latch assembly 20 is used in a vehicle for raising and lowering the height of the vehicle.

As best shown in FIG. 1, the rotating latch assembly 20 includes a lift housing 22, having a generally tubular shape, disposed annularly about and extending along a center axis A between a first opened end 24 and a second opened end 26. The lift housing 22 defines a chamber 28 extending along the center axis A between the first opened end 24 and the second opened end 26. A lift springs seat 29 is disposed about the first opened end 24 of the lift housing 22 and extends annularly about the center axis A. A support tube 30, having a generally cylindrical shape, is disposed in the chamber 28 of the lift housing 22. The support tube 30 extends about the center axis A between a first end 32 and a second end 34. The support tube 30 is slidable along the center axis A in the chamber 28 with respect to the lift housing 22. The first end 32 of the support tube 30 is disposed outside of the chamber 28 and spaced from the first opened end 24. The second end 34 of the support tube 30 is also disposed outside of the chamber 28 and spaced from the second opened end 26. It should be appreciated that in one embodiment of the present invention, the lift housing 22 can be connected to an actuator, e.g. a hydraulic actuator, for moving the lift housing 22 axially along the support tube 30.

The support tube 30 includes a first portion 36 and a second portion 38. The first portion 36 of the support tube is disposed adjacent to the first end 32 and extends about the center axis A to define a first diameter $D_1$. The second portion 38 of the support tube 30 is spaced from the first portion 36, disposed adjacent to the second end 34, and extends about the center axis A to define a second diameter $D_2$ with the second diameter $D_2$ being greater than the first diameter $D_1$. In other words, the first portion 36 of the support tube 30 is narrower than the second portion 38 of the support tube 30. An intermediate portion 40 extends between the first portion 36 and the second portion 38 to connect the first portion 36 with the second portion 38. The intermediate portion 40 extends radially outwardly from the first portion 36, perpendicular to the center axis A, to the second portion 38 to connect the first portion 36 with the second portion 38 and define a shoulder 42 extending along the intermediate portion 40. The intermediate portion 40 and the lift housing 22 defines a compartment 44 extending between the shoulder 42, the first portion 36 of the support tube 30, and the lift housing 22.

Figure 2:
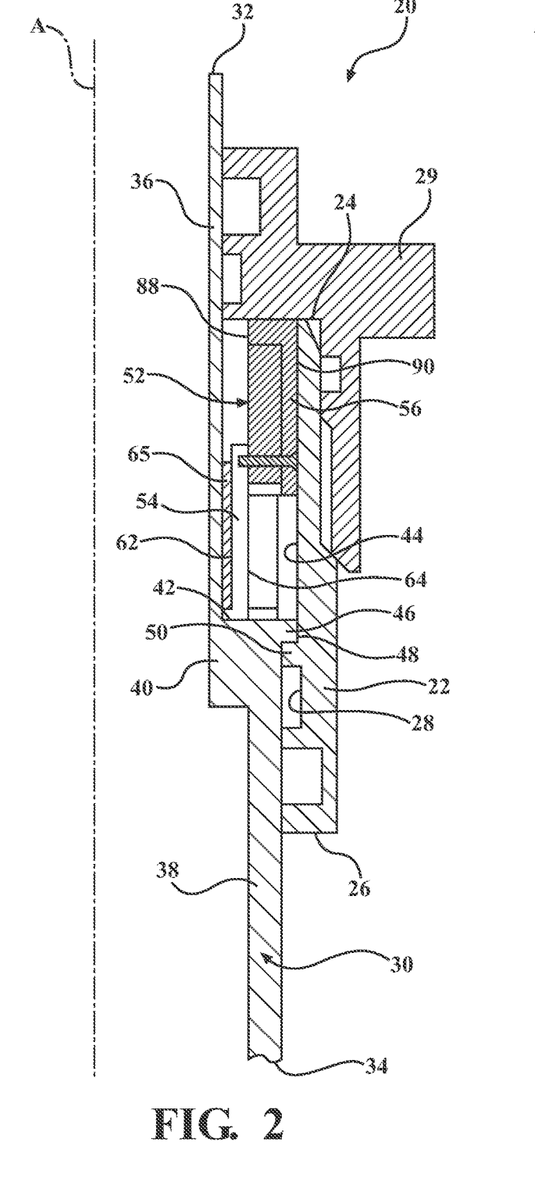
FIG. 2 is a cross-sectional perspective view of the rotating latch assembly with the lift housing being in the extended position.
Figure 3:
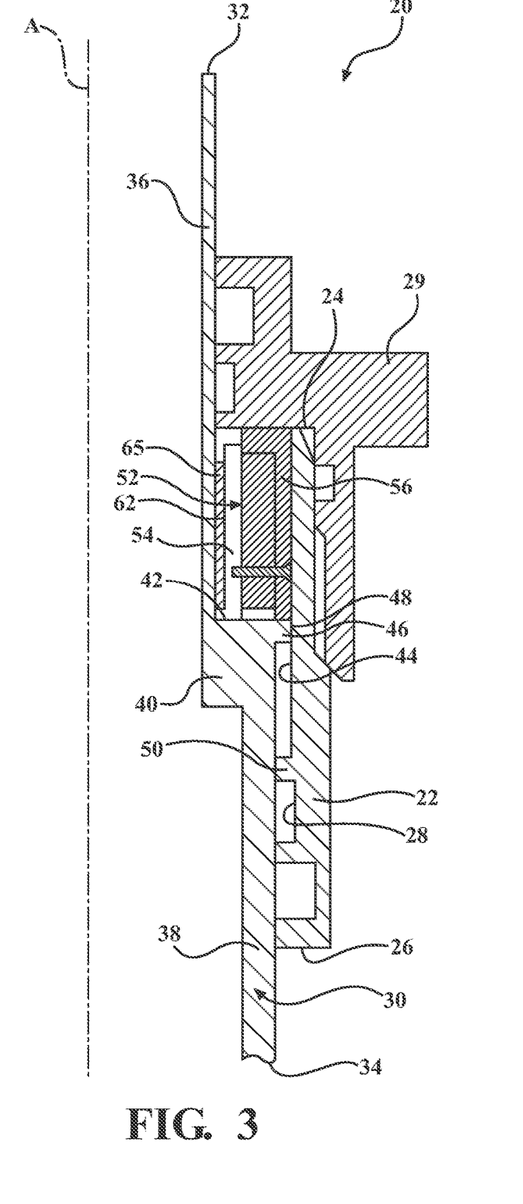
FIG. 3 is a cross-sectional side view of the outer ring of the rotating latch assembly.

As best illustrated in FIGS. 2 and 3, the intermediate portion 40 includes a projection 46, disposed in the chamber 28, extending radially outwardly from the intermediate portion 40, and perpendicular to the center axis A, to a distal end 48 for engaging the lift housing 22. The lift housing 22 includes a protrusion 50, disposed in the chamber 28 and adjacent to the second end 26, extending radially inwardly toward the center axis A for engaging the projection 46 of the intermediate portion 40 to allow the lift housing 22 to move axially along the support tube 30 between an extended position and a lowered position in response to the axial movement provided by the actuator. When in the extended position, as illustrated in FIG. 2, the projection 46 and the protrusion 50 are in an abutment relationship with one another for raising the height of the vehicle. In the lowered position, as illustrated in FIG. 3, the projection 46 and the protrusion 50 is axially spaced from one another for lowering the height of the vehicle.

Figure 5:
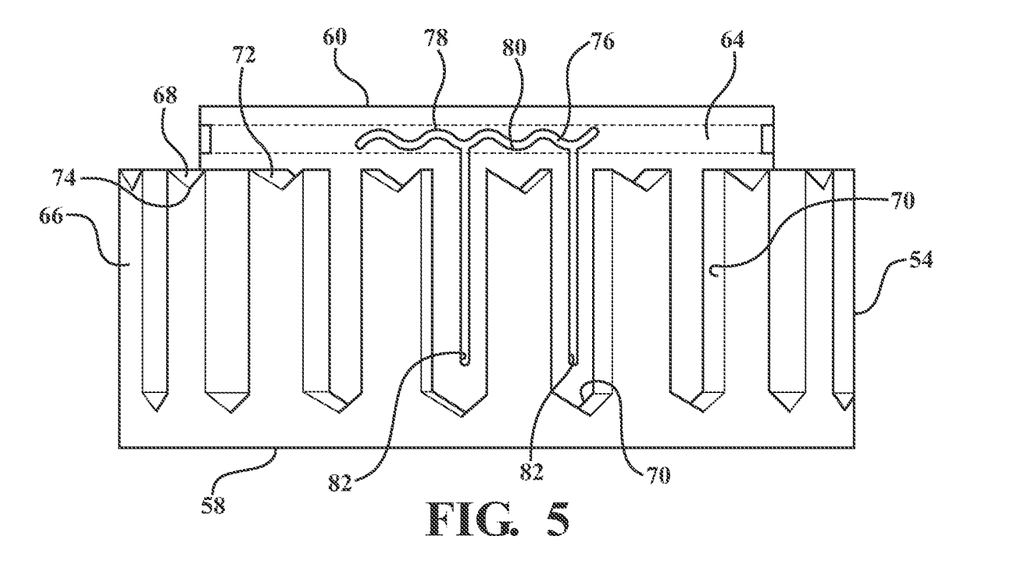
FIG. 5 is a cross-sectional perspective view of the rotating latch assembly with the lift housing being in the lowered position.
Figure 6:
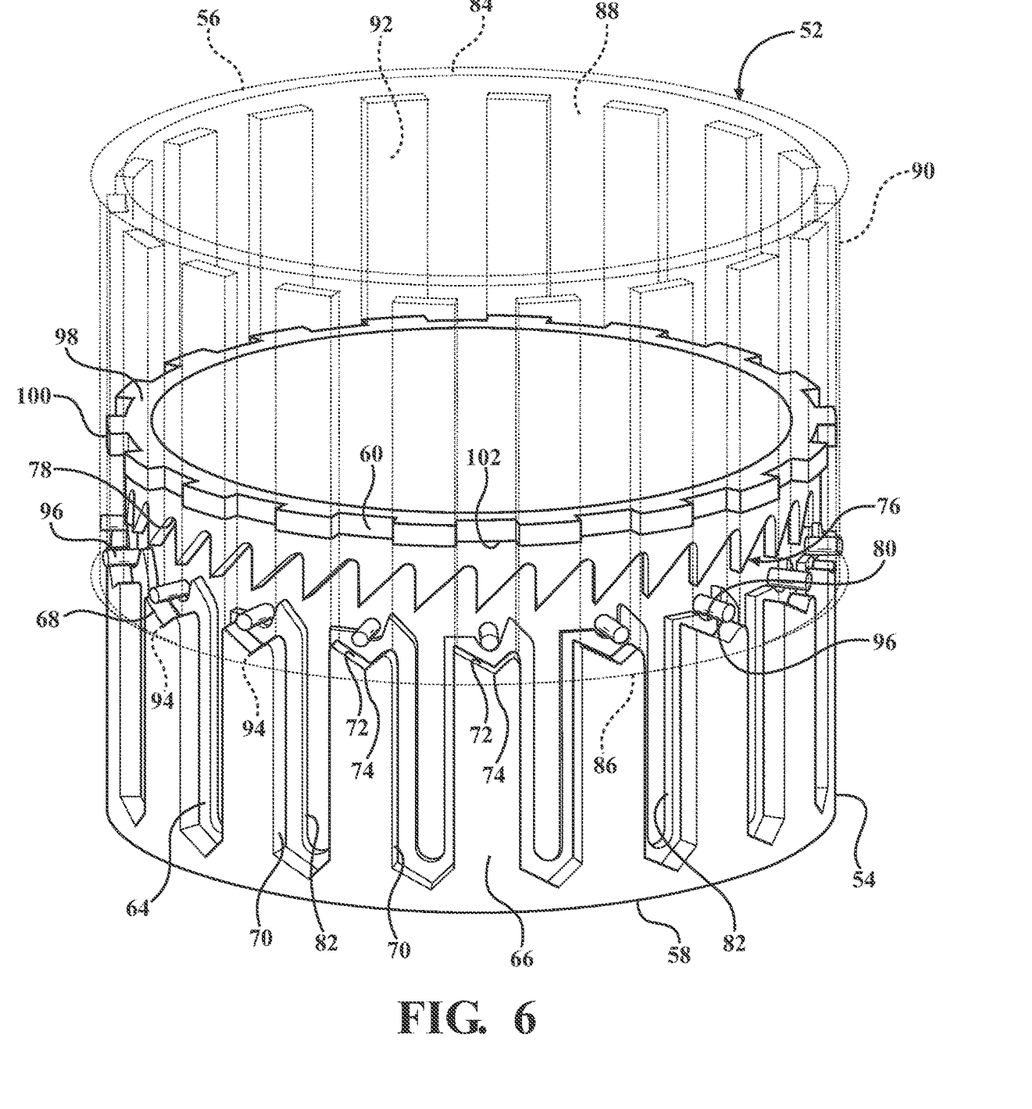
FIG. 6 is a perspective view of the inner ring and the outer ring of the retaining member with the lift housing being the extended position.
Figure 7:
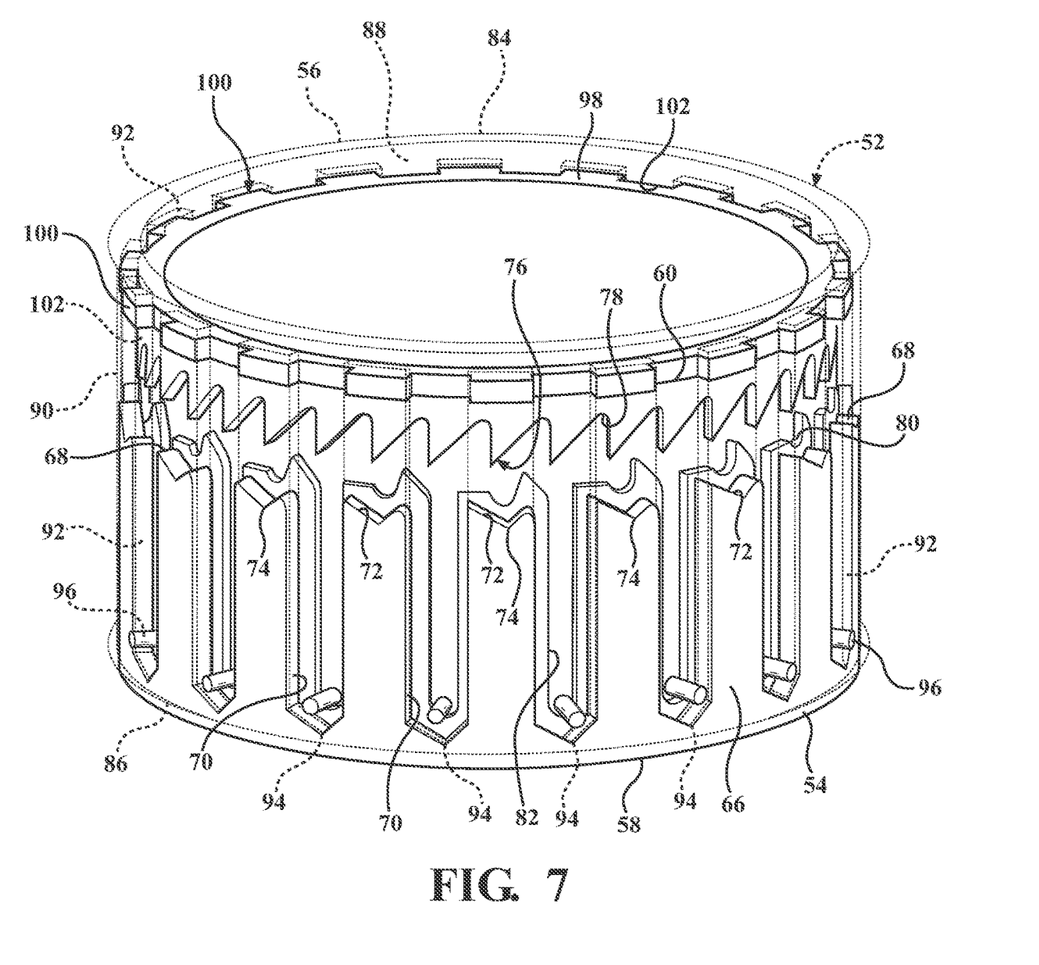
FIG. 7 is a perspective view of the inner ring and the outer ring of the retaining member with the lift housing being in the lowered position.
Figure 8:
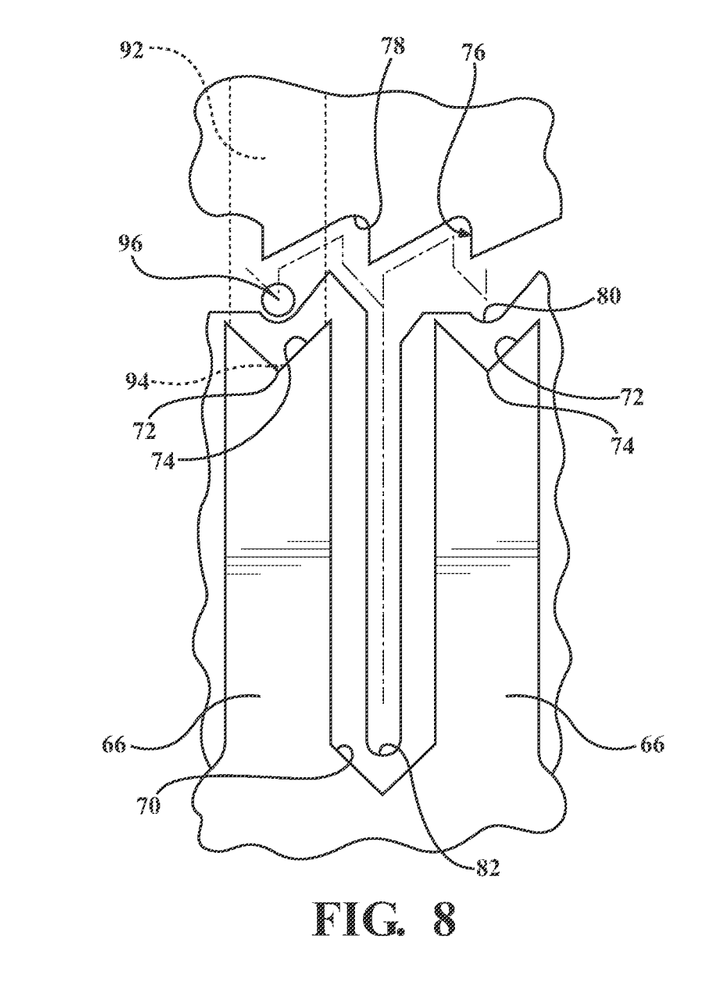
FIG. 8 is enlarged fragmentary view of the outer ring teeth and the inner ring teeth in the extended position.

A retaining member 52 is disposed in the compartment 44, attached to the support tube 30 and the lift housing 22, for maintaining the lift housing 22 in the extended position as the lift housing 22 is moving from the lowered position to the extended position and allowing the lift housing 22 to move from the extended position to the lowered position. As best shown in FIGS. 5-7, the retaining member 52 includes an inner ring 54 and an outer ring 56 with the inner ring 54 being attached to the support tube 30 and the outer ring 56 being attached to the lift housing 22. The inner ring 54 and the outer ring 56 engage one another and are rotatable relative to one another for translating the axial movement of the lift housing 22 into a rotational movement to allow the lift housing 22 to be maintained in the extended position and allow the lift housing 22 to be moved from the extended position to the lowered position.

Figure 9:
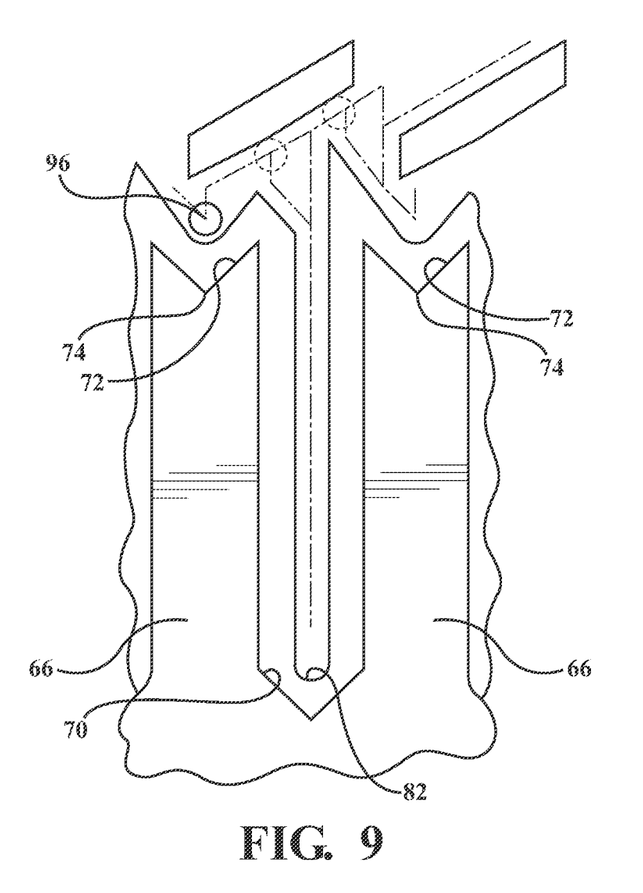
FIG. 9 is enlarged fragmentary view of the outer ring teeth and the inner ring teeth of an alternative embodiment of the inner ring and the outer ring.

As best shown in FIGS. 5, 6, and 7, the inner ring 54, having a generally cylindrical shape, is disposed in the compartment 44 extending between a lower end 58 and an upper end 60. The lower end 58 of the inner ring 54 is disposed in abutment relationship with the shoulder 52. The inner ring 54 has an interior surface 62 and an exterior surface 64 both extending annularly about the center axis A and between the lower end 58 and the upper end 60. A bushing 65, having a generally cylindrical shape, is disposed between the interior surface 62 and the first portion 36 of the support tube 30. The bushing 65 is attached to the first portion 36 of the support tube 30, e.g. by press fit, and the inner ring 54 rotatably disposed about the bushing 65. A plurality of inner ring teeth 66, circumferentially spaced from one another, extends radially outwardly from the exterior surface 64 of the inner ring 54, along the center axis A, to a terminal end 68 spaced from the upper end 60 and defining a plurality of slots 70 between the adjacent inner ring teeth 66, circumferentially spaced from one another, and extending along the center axis A. The terminal end 68 for each of the inner ring teeth 66 defining a cavity 72, having a generally V-shape, extends along the center axis A toward the lower end 58 and having a nadir 74 axially spaced from the terminal end 68. The exterior surface 64 of the inner ring 54 defines a pathway 76 extending radially inwardly toward the center axis A and sinusoidally about the inner ring 54. As best illustrated in FIGS. 5-8, the pathway 76 defines a plurality of peaks 78 and troughs 80. The exterior surface 64 of the inner ring 54 further defines a plurality of channels 82, circumferentially spaced from one another, extending parallel to the slots 70 and connected to the pathway 76. The peaks 78 of the pathway 76 are offset from the terminal end 68 of the inner ring teeth 66. The troughs 80 are in alignment with the nadir 74 and are connected to the channels 82. As best illustrated in FIG. 9, accordingly to another embodiment of the present invention, instead of allowing the lift housing 22 to move between the extended position and the lowered position, the pathway 76 can include three different position, e.g. the extended position, a raised position, and the lowered position. It should also be appreciated that an external position control needs to be used to control cycle and the position of the outer ring 56.

Figure 4:
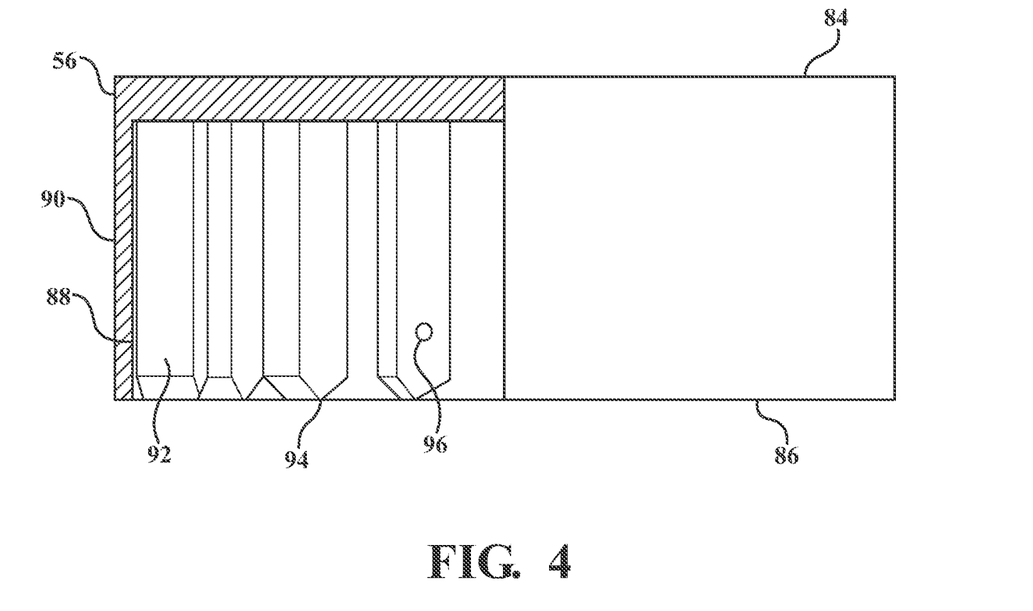
FIG. 4 is a side view of the inner ring of the rotating latch assembly.

As best shown in solid line of FIG. 4 and dash line in FIGS. 6 and 7, the outer ring 56, having a generally circular shape, is disposed in the compartment 44 and extends between a top end 84 and a bottom end 86. The outer ring 56 also has an inner surface 88 and an outer surface 90. The inner surface 88 and the outer surface 90 extend about the center axis A between the top end 84 and the bottom end 86 with the top end 84 being attached to the lift housing 22 for engaging the inner ring 54. The inner surface 90 of the outer ring 56 includes a plurality of outer ring teeth 92, circumferentially spaced from one another, extending radially outwardly from the inner surface 88 of the outer ring 56, along the center axis A, and tapering to a primary end 94 for engaging the nadir 74 in the extended position. This feature allows the lift housing 22 to be locked in the extended position without additional input from the hydraulic actuator. In addition, the primary end 94 being disposed in the cavity 72 in the extended position prevents any unintentional movements of the lift housing 22 from the extended position to the lowered position.

The outer ring 56 includes a plurality of nubs 96 disposed at the primary end 94 of the outer ring teeth 92 and extending radially inwardly toward the center axis A to engage the pathway 76 and the channel 82 to allow the lift housing 22 to move between the extended position and the lowered position. A stop ring 98, having a generally circular shape, disposed in the compartment 44, adjacent to the bushing 65. A plurality of lips 100, circumferentially spaced from one another, extends radially outwardly from the stop ring 98 and defines a plurality of gap 102 disposed between the adjacent lips 100 for receiving the outer ring teeth and limits the movement of the outer ring teeth 92.

In operation, in response to an axial movement provided by the actuator, the lift housing 22 moves along the center axis A and the support tube 30 from the lowered position. While in the lowered position, the outer ring teeth 92 are received in the slots 70 between the inner ring teeth 66. As the lift housing 22 moves axially along the support tube 30, the nubs 96 of the outer ring 56 slides along the channels 82 to the pathway 76. As the nubs 96 of the outer ring 56 slides along with the pathway 76, the axial movement provided by the hydraulic actuator is converted to a rotational movement thereby rotating the inner ring 54 about the center axis A. By rotating the inner ring 54 the outer ring teeth 92 aligns with the inner ring teeth 66 allowing the primary end 94 of the outer ring teeth 92 to be received in the cavity 72 of the inner ring teeth 66 thereby defining the extended position to increase the height of the vehicle. Based on the engagement between the outer ring teeth 92 and the inner ring teeth 66, the outer ring teeth 92 is rested in the cavity 72 of the inner ring teeth 66 thereby maintaining the lift housing 22 in the extended position without any additional force input provided by the hydraulic actuator. To move from the extended position to the lowered position, the hydraulic actuator provides another axial movement to lift housing 22 causing the inner ring teeth 66 and the outer ring teeth 92 to move axially away from one another. At the same time, the nub 96 of the outer ring teeth 92 slides along the pathway 76 and converts the axial movement provided by the hydraulic actuator to a rotational movement thereby rotating the inner ring 54 about the center axis A. By rotating the inner ring 54, the outer ring teeth 92 aligns with the slots 70 between inner ring teeth 66 allowing the outer ring teeth 92 to be received in the slots 70 between the inner ring teeth 66 thereby defining the lowered position to decrease the height of the vehicle. In other words, to move between the lowered position and the extended position, only a raising force is used to move the lift housing 22 axially along the support tube and the center axis A.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A rotating latch assembly for raising and lowering a vehicle, the rotating latch assembly comprising:
    a lift housing disposed on a center axis and extending between a first opened end and a second opened end and defining a chamber extending therebetween;
    a support tube slidably disposed in said chamber and extending between a first end and a second end, said lift housing being movable along said support tube between an extended position and a lowered position in response to a movement provided by an actuator, said extended position being defined as said lift housing being adjacent to said first end for raising the height of the vehicle and said lowered position being defined as said lift housing being adjacent to said second end for lowering the height of the vehicle;
    a retaining member disposed between said lift housing and said support tube and attached to said support tube and said lift housing for maintaining said lift housing in said extended position and allowing said lift housing to move from said extended position to said lowered position;
    wherein said retaining member includes an inner ring and an outer ring, said inner ring being attached to said support tube and said outer ring being attached to said lift housing;
    wherein said inner ring extends between a lower end and an upper end and has an interior surface and an exterior surface with said interior surface and said exterior surface extending about the center axis;
    wherein said rotating latch assembly includes a plurality of inner ring teeth circumferentially spaced from one another, extending radially outwardly from said exterior surface along said center axis to a terminal end and defining a plurality of slots between said inner ring teeth, circumferentially spaced from one another, extending along the center axis; and wherein said terminal end for each of said inner ring teeth defines a cavity of generally V-shape extending along said center axis toward the lower end and having a nadir axially spaced from said terminal end.

2. The rotating latch assembly as set forth in claim 1, wherein said inner ring and said outer ring engage one another and are rotatable relative to one another for translating an axial movement of said lift housing into a rotational movement about said support tube to allow said lift housing to be maintained in said extended position and allow said lift housing to be moved from said extended position to said lowered position.

3. The rotating latch assembly as set forth in claim 1, wherein said terminal end is spaced from said upper end.

4. The rotating latch assembly as set forth in claim 1, wherein said exterior surface of said inner ring defines a pathway extending radially inwardly toward said center axis and about said inner ring.

5. The rotating latch assembly as set forth in claim 4 wherein said pathway extends sinusoidally about said inner ring.

6. The rotating latch assembly as set forth in claim 5 wherein said pathway has a plurality of peaks and troughs disposed about said center axis with said peaks being circumferentially spaced from said terminal end and said troughs being in alignment with said nadir.

7. The rotating latch assembly as set forth in claim 6 wherein said exterior surface of said inner ring defines a plurality of channels, circumferentially spaced from one another, extending radially inwardly toward said center axis and parallel to said slots, and connected to said pathway.

8. The rotating latch assembly as set forth in claim 7 wherein said outer ring extends between a top end and a bottom end, said outer ring having an inner surface and an outer surface extending about said center axis between said top end and said bottom end, said top end being attached to said lift housing for engaging said inner ring.

9. The rotating latch assembly as set forth in claim 8 including a plurality of outer ring teeth extending radially outwardly from said inner surface, circumferentially spaced from one another, and along said center axis and tapering to a primary end for engaging said nadir of said cavity in said extended position.

10. The rotating latch assembly as set forth in claim 9 including a plurality of nubs disposed at said primary end of said outer ring teeth and extending radially inwardly toward said center axis to engage said pathway and said channel to allow said lift housing to move between said extended position and said lowered position.

11. The rotating latch assembly as set forth in claim 10 further including a stop ring disposed at said first end of said support tube, rotatable about said center axis; and
a plurality of lips, circumferentially spaced from one another, extending radially outwardly from said stop ring and defining a plurality of gaps disposed between adjacent lips for receiving said outer ring teeth and limiting movement of said outer ring teeth.

12. A rotating latch assembly for raising and lowering a vehicle, the rotating latch assembly comprising:

a lift housing disposed on a center axis and extending between a first opened end and a second opened end and defining a chamber extending therebetween;
a support tube slidably disposed in said chamber and extending between a first end and a second end with said first end being disposed outside of said chamber and axially spaced from said first opened end and said second end of said support tube being disposed outside of said chamber and axially spaced from said second opened end;
a projection disposed in said chamber and extending radially outwardly from said support tube to a distal end for engaging said lift housing;
a protrusion disposed in said chamber and adjacent to said second opened end extending radially inwardly from said lift housing and toward the center axis for engaging said projection to allow said lift housing to move axially along said support tube between an extended position and a lowered position in response to a movement provided by an actuator with said extended position being defined as said lift housing being adjacent to said first end for raising the height of the vehicle and said lowered position being defined as said lift housing being adjacent to said second end for lowering the height of the vehicle; and
a retaining member disposed between said lift housing and said support tube and attached to said support tube and said lift housing for maintaining said lift housing in said extended position as said lift housing moving from said lowered position to said extended position and allowing said lift housing to move from said extended position to said lowered position.

13. The rotating latch assembly as set forth in claim 12 wherein said retaining member includes an inner ring and an outer ring with said inner ring being attached to said support tube and said outer ring being attached to said lift housing.

14. The rotating latch assembly as set forth in claim 13 wherein said inner ring and said outer ring engage one another and are rotatable relative to one another for translating an axial movement of said lift housing into a rotational movement about said support tube to allow said lift housing to be maintained in said extended position and allow said lift housing to be moved from said extended position to said lowered position.

15. The rotating latch assembly as set forth in claim 14 wherein said inner ring is disposed between said support tube and said lift housing, extending between a lower end and an upper end, and has an interior surface and an exterior surface with said interior surface and said exterior surface extending about the center axis between said lower end and said upper end.

16. The rotating latch assembly as set forth claim 15 including a plurality of inner ring teeth circumferentially spaced from one another, extending radially outwardly from said exterior surface along said center axis to a terminal end spaced from said upper end and defining a plurality of slots between said inner ring teeth, circumferentially spaced from one another, extending along the center axis.

* * * * *